3,240,813
PROCESS FOR PREPARING 2-CHLORO-PROPIONALDEHYDE
Clarence R. Dick, Lake Jackson, Tex., assignor to The Dow Chemical Company, Midland, Mich., a corporation of Delaware
No Drawing. Filed May 29, 1961, Ser. No. 113,098
2 Claims. (Cl. 260—601)

This invention relates to an improved process for preparing 2-chloropropionaldehyde.

In a known process (see French Patent 1,012,991) 2-chloroacetaldehyde was prepared by chlorination of acetaldehyde in an aqueous hydrochloric acid solution at a temperature of from about 5° C. to about 20° C. During the course of the reaction, HCl is continuously formed as a by-product of the chlorination and is allowed to remain in the solution; consequently the HCl concentration increases as the reaction proceeds. In one example conducted according to the known process the acid concentration at the beginning of the reaction was 2.1 Normal and in each of two additional examples 6.5 Normal, and at the conclusion of the reactions, the acid concentrations were 7.0 Normal and about 10 Normal in each of the latter two examples, all normalities being with respect to hydrochloric acid, and the yields of 2-chloropropionaldehyde were 33 percent, 33 percent and 41 percent, respectively.

However, it has now been found that in the improved process of the present invention there are obtained yields of about 90 percent of 2-chloropropionaldehyde. This improved process comprises chlorinating propionaldehyde at from about 5° C. to about 25° C. in an aqueous hydrochloric acid solution. After the reaction has begun and at intervals during the course of the reaction, a small sample of the reaction mixture is withdrawn and the acid concentration determined, as for example, by titration. Then there is added to the reaction mixture sufficient water to adjust the acid concentration to from about 4 Normal to about 8 Normal, preferably to about 6 Normal, all normalities being with respect to total acid. This sampling, analysis and dilution with water is repeated periodically for the duration of the reaction. When the reaction is completed, the desired product can be separated from the reaction mixture by known methods, usually by distillation.

The practice of the present invention is illustrated by the following example.

Example 464 grams (8.0 moles) of freshly distilled propionaldehyde were added dropwise to 2000 ml. of 6 N hydrochloric acid that had been cooled to 0° C., the addition of aldehyde being sufficiently slow to maintain the temperature of the mixture below 5° C. After the addition of the propionaldehyde was completed, the temperature was increased to 8–12° C. and chlorine was admitted to the reaction mixture at a rate of approximately 1.5–1.6 grams per minute for the remainder of the reaction.

Twenty minutes after the beginning of the addition of the chlorine, and at twenty minute intervals thereafter, one ml. of the reaction mixture was withdrawn from the flask and titrated with N/10 sodium hydroxide to determine the acid concentration. Then, based on the acid concentration, an amount of water was added to decrease the acid concentration, with respect to total acid, to 6 Normal. During the entire course of the reaction the acid concentration was thus maintained between 6.0–6.2 Normal. After the reaction was completed, the volume of the reaction mixture was increased from 3345 ml. to 4500 ml. by dilution with water and 695 grams of crude aldehyde were distilled from the mixture at 52–64° C. and 185 mm. pressure. This fraction, corrected for water content, represented 586 grams of 2-chloropropionaldehyde. The aqueous phase remaining in the reaction flask was continuously extracted with ether and an additional 102 grams of aldehyde were isolated from the extract. The total yield of 2-chloropropionaldehyde obtained was 688 grams, representing 93.8 percent of the theoretical, based on the propionaldehyde charged.

In the process of the present invention a small proportion of the propionaldehyde present, i.e., from 0.5 to 1.0 percent, is converted to propionic acid, which is titrated, in addition to hydrochloric acid, in determining the total acid concentration. Therefore the term "total acid" is used to include both the hydrochloric and the propionic acid present.

I claim:

1. In a process where propionaldehyde is contacted at a temperature of from about 5° C. to about 25° C. with chlorine in an aqueous hydrochloric acid solution, so as to prepare 2-chloropropionaldehyde, the improvement of adding water to the reaction mixture in amounts sufficient to maintain the concentration, with respect to total acid, at from about 4 Normal to about 8 Normal.

2. A process as in claim 1 wherein the concentration with respect to total acid is maintained at about 6 Normal.

References Cited by the Examiner

UNITED STATES PATENTS

| 2,552,934 | 5/1951 | Cave et al. | 260—601 |
| 2,797,195 | 6/1957 | Neubauer et al. | 260—648 |

FOREIGN PATENTS

| 1,012,991 | 7/1952 | France. |

OTHER REFERENCES

Krattiger: Bull. Soc. Chim., pp. 223, 224 (1953) (France).

Shchukina: Chemical Abstracts, vol. 43 (1949), pages 2575–2576.

LEON ZITVER, Primary Examiner.

CHARLES B. PARKER, Examiner.